May 16, 1939.   H. R. PRESCOTT   2,158,198
METHOD AND APPARATUS FOR MAKING GEOLOGICAL EXPLORATIONS
Filed July 25, 1935   6 Sheets—Sheet 1
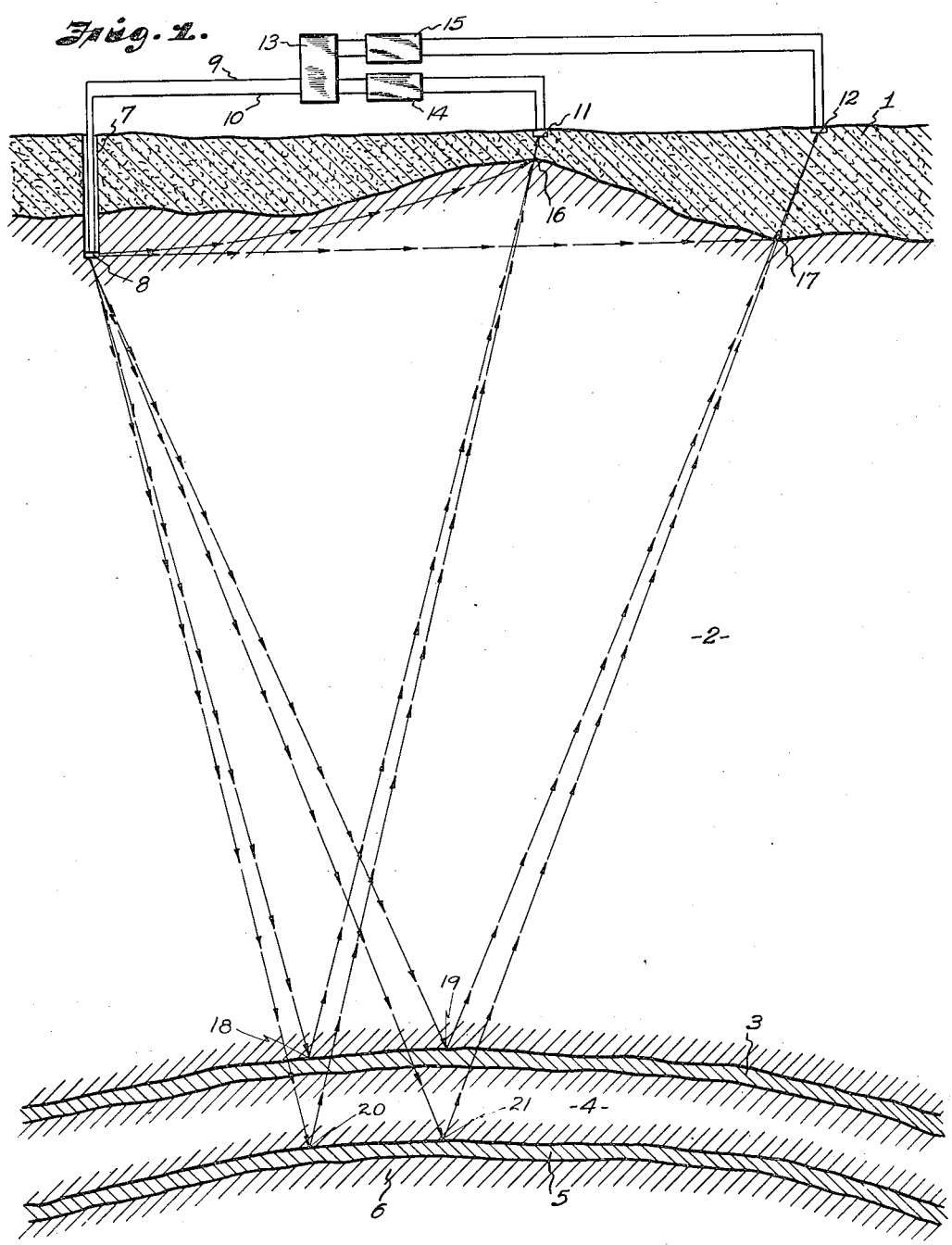
INVENTOR
Harold R. Prescott
BY Thos. E. Scofield
ATTORNEY May 16, 1939.  H. R. PRESCOTT  2,158,198
METHOD AND APPARATUS FOR MAKING GEOLOGICAL EXPLORATIONS
Filed July 25, 1935    6 Sheets-Sheet 2
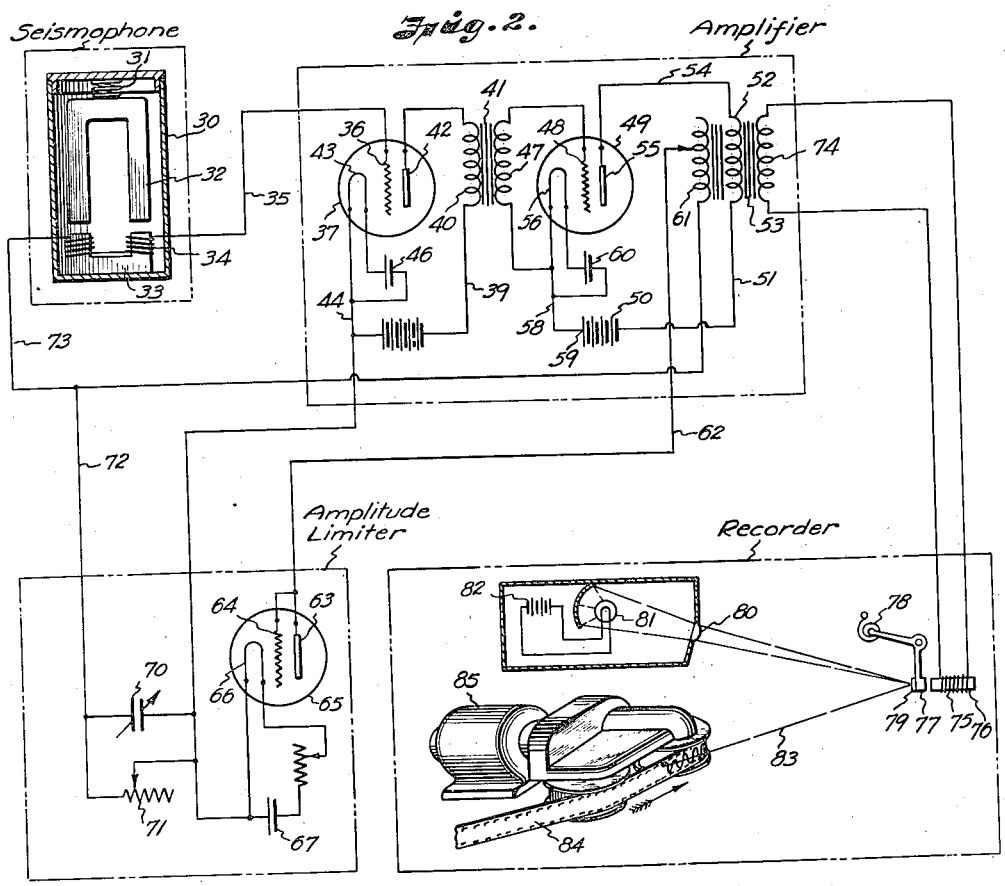
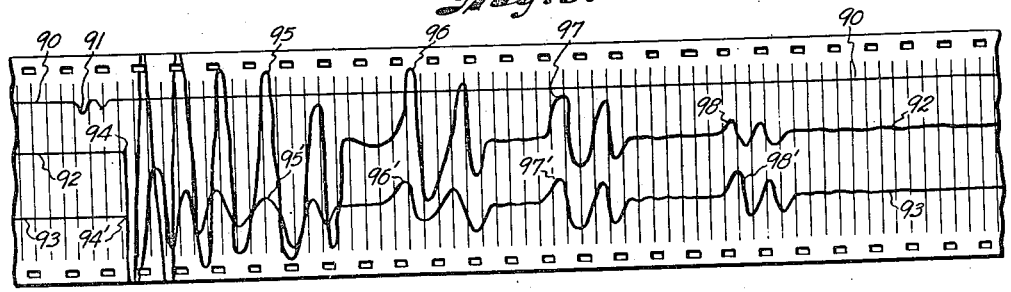
INVENTOR
Harold R. Prescott
BY
ATTORNEY

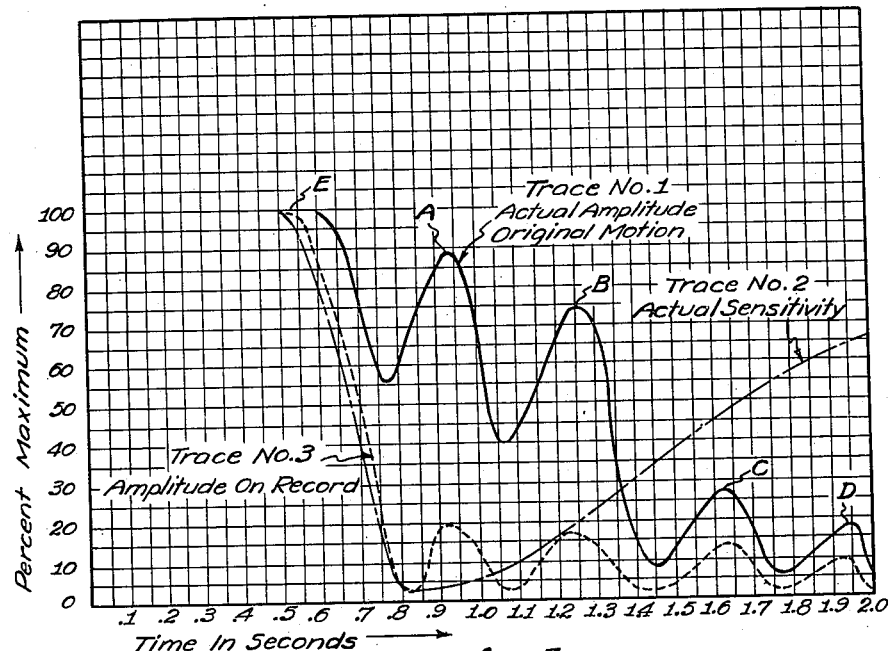
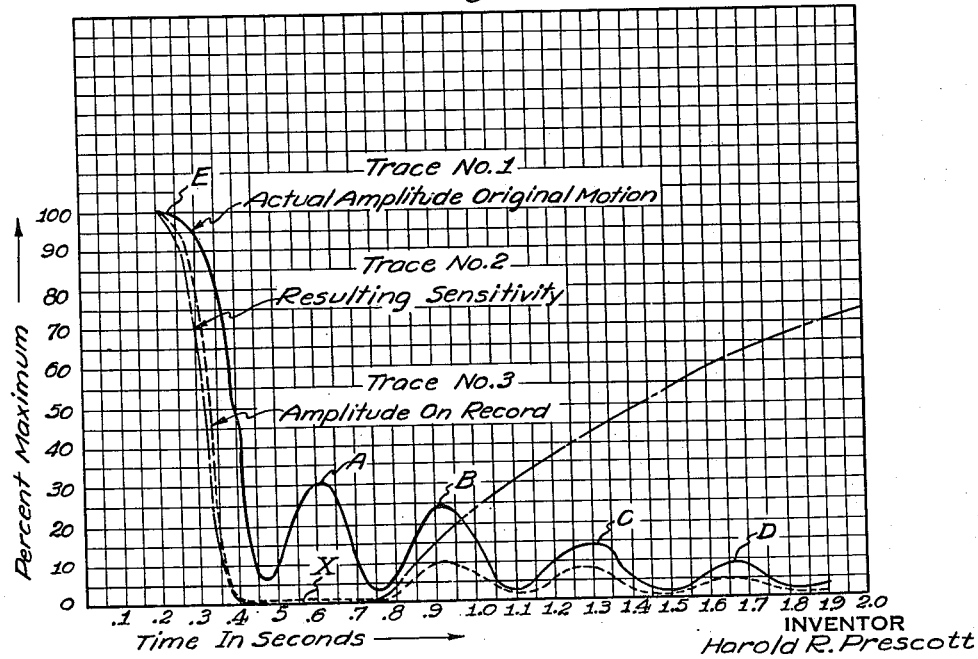

May 16, 1939. H. R. PRESCOTT 2,158,198
METHOD AND APPARATUS FOR MAKING GEOLOGICAL EXPLORATIONS
Filed July 25, 1935 6 Sheets-Sheet 4
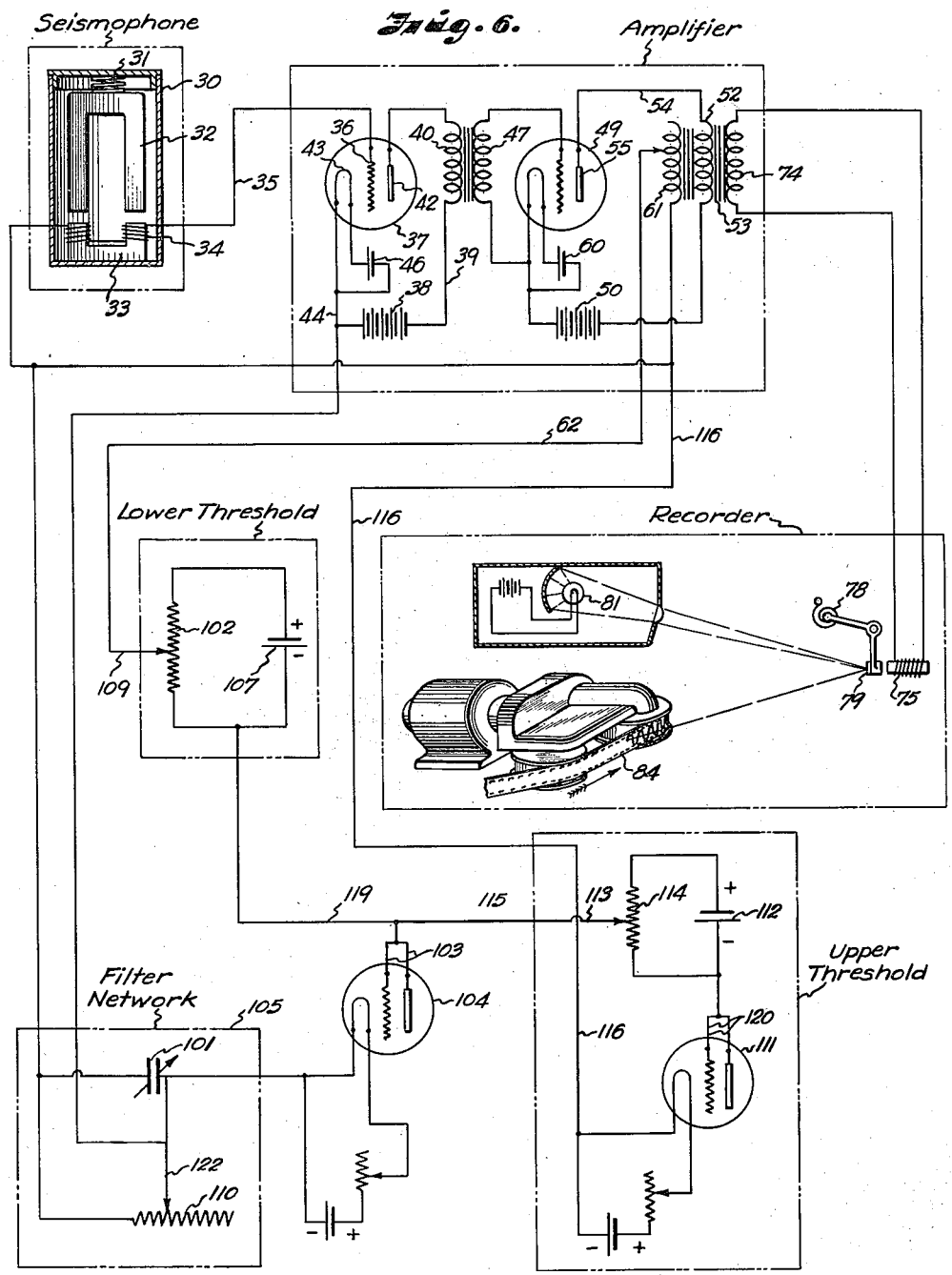
INVENTOR
Harold R. Prescott
BY
ATTORNEY May 16, 1939.     H. R. PRESCOTT     2,158,198
METHOD AND APPARATUS FOR MAKING GEOLOGICAL EXPLORATIONS
Filed July 25, 1935     6 Sheets-Sheet 5
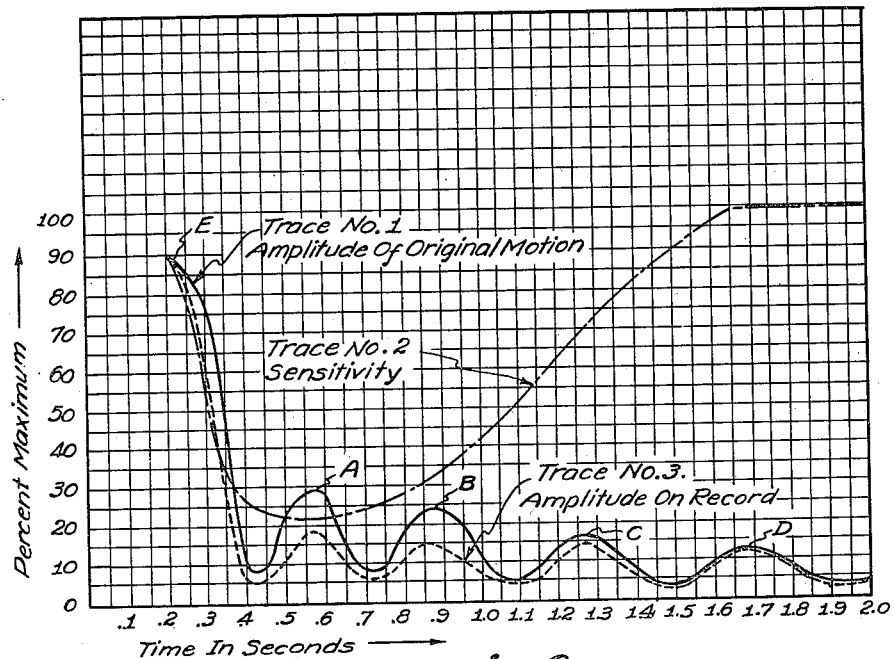
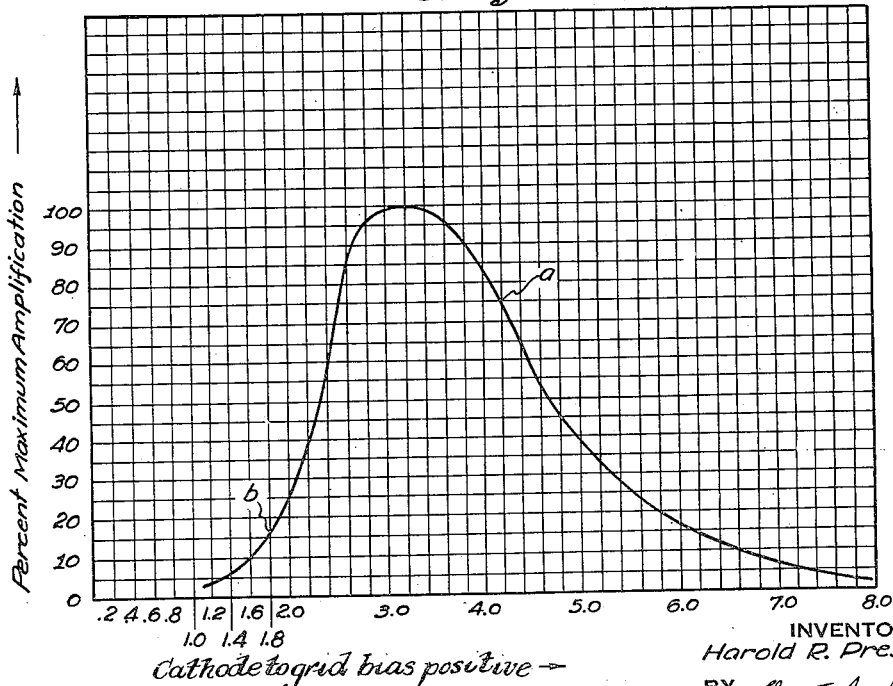
INVENTOR
Harold R. Prescott
BY
ATTORNEY

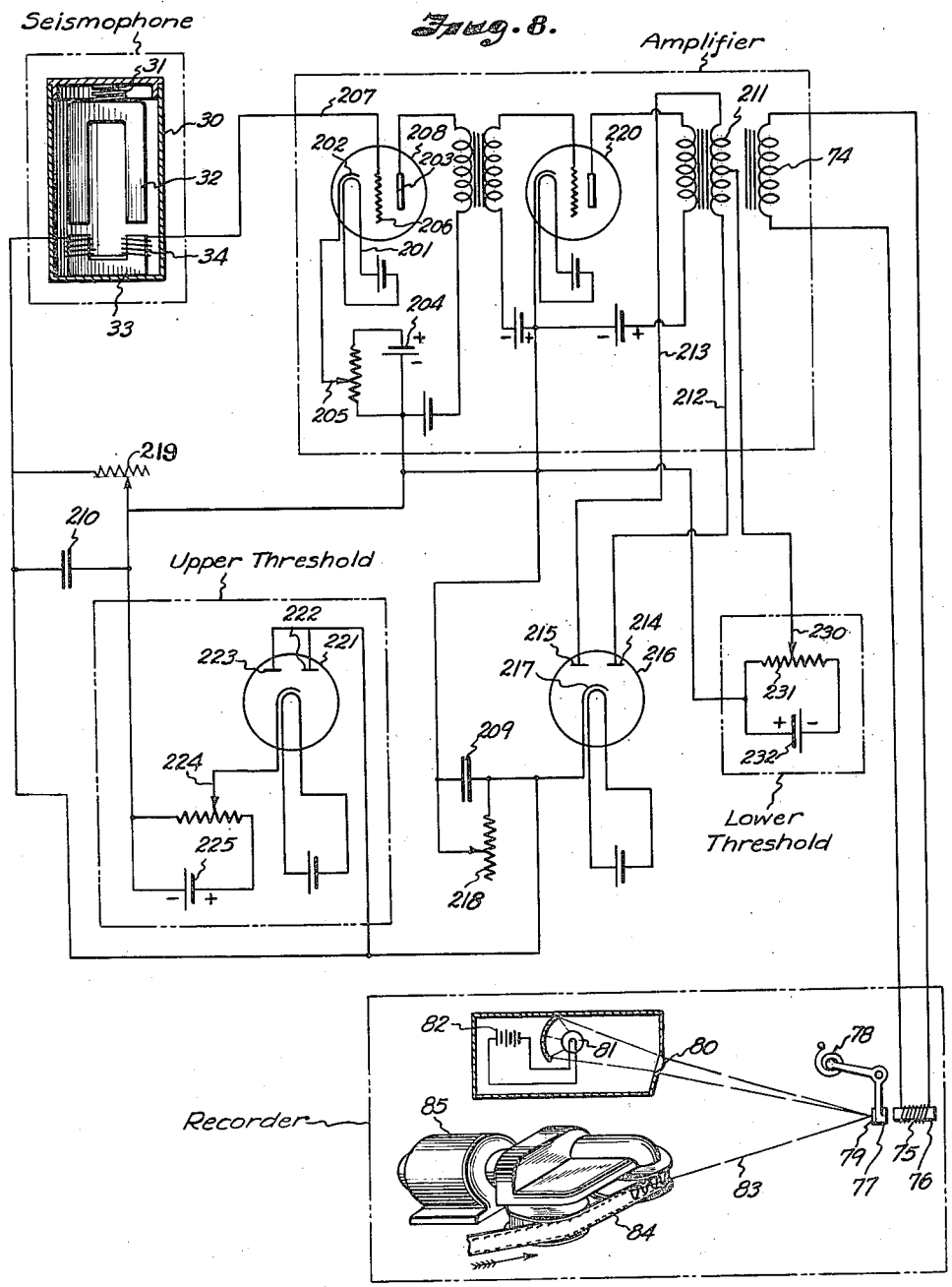

Patented May 16, 1939

2,158,198

UNITED STATES PATENT OFFICE 2,158,198

METHOD AND APPARATUS FOR MAKING GEOLOGICAL EXPLORATIONS

Harold R. Prescott, Ponca City, Okla., assignor to Continental Oil Company, Ponca City, Okla., a corporation of Delaware Application July 25, 1935, Serial No. 33,029

8 Claims. (Cl. 177—352)

My invention relates to a method and apparatus for making geological explorations and more particularly to a method and apparatus for automatically limiting electric manifestations in sympathy with earth vibrations.

In application Serial No. 721,541, in which Frank L. Searcy and myself are joint inventors, a device for automatically limiting the amplitude of recorded earth vibrations independent of the amplitude of vibrations received by a seismophone is shown. The method and apparatus in application Serial No. 721,541, functions well when the seismophones or receptor stations are well removed from the point of origin of the elastic waves. When, however, seismophones are placed close to the shot points or points of origin of the seismic waves, the apparatus shown in application Serial No. 721,541 fails to accomplish the desired results.

In the accompanying drawings which form part of the instant specification and are to be read in conjunction therewith and in which like reference numerals are used to indicate like parts in the various views, Figure 1 is a diagrammatic cross sectional view of a section of the earth's surface showing some paths taken by vibrations generated near the earth's surface.

Figure 2 is a schematic view of the form of apparatus shown in application Serial No. 721,541.

Figure 3 is a conventionalized view of a record strip taken with the apparatus shown in application Serial No. 721,541.

Figure 4 is a graph explanatory of the action of the apparatus shown in application Serial No. 721,541 under conditions in which seismophones were well removed from the shot points.

Figure 5 is a graph explanatory of the action of the apparatus shown in Serial No. 721,541 under conditions in which the seismophones are placed close to the shot points.

Figure 6 is a diagrammatic view of one form of device capable of carrying out the process and embodying the apparatus of my invention.

Figure 7 is a graph explanatory of the apparatus shown in Figure 6.

Figure 8 is a diagrammatic view of another form of apparatus capable of carrying out the method and showing another embodiment of my invention.

Figure 9 is a graph showing the relationship between amplification and the amount of positive potential for one of the tubes shown in Figure 8.

Referring now to Figure 1 in which I represents the weathered or unconsolidated layer of the earth's surface and layer 2 a consolidated layer of the earth's crust, layer 3 is a formation of different characteristics than layer 2. Layer 4 is a layer of the same general characteristics as layer 2. Layer 5 has the same general characteristics as layer 3 and layer 6 is similar in character to layer 2. It is desirous to position the point of origin of the vibrations in a consolidated layer. To this end, a drill hole 7 is made through the weathered layer 1 to the layer 2. A charge of explosive 8 is positioned in the bottom of the drill hole 7. 13 represents a recording device, conductors 9 and 10 recording the instant of the origin of the earth vibrations. 11 and 12 represent seismophones connected by suitable conductors to respective amplifying devices 14 and 15 which, in turn, are adapted to transfer their respective outputs to recorder 13. The vibrations generated at 8 travel out in all directions. The direct wave will arrive at the vibration sensitive devices by approximate paths 8—16—11, and 8—17—12. Part of the vibrations will pass downwardly to strata 3 and a portion will be returned or echoed back to the earth's surface. Path 8—18—16—11 is the approximate path of travel of such vibrations which travel to the seismophone 11. Path 8—19—17—12 is the approximate path of the vibrations which travel to seismophone 12. The vibration sensitive instruments 11 and 12 receive these vibrations and transfer them into sympathetic electrical vibrations which are amplified by respective amplifying means 14 and 15, and recorded in recorder 13 upon a common record strip which is later removed for analysis.

Weathered layer 1 of the earth's surface is of variable thickness. It will be noted that the vibrations traveling along path 8—16—11 pass through less thickness of weathering than the vibrations traveling along path 8—17—12. If it is assumed that the vibrations reaching point 16 were of amplitude equal to those reaching point 17, the vibrations received at 11 would be different than those received at 12, due to the variation in the thickness of the weathered layer 1.

Similarly, other waves will penetrate to the deeper lying strata 5 following paths 8—20—16—11 and 8—21—17—12 respectively.

Referring now to Figure 2, suspended from a suitable frame 30 by resilient means 31 is an electromagnet 32 in proximity to which is placed an armature 33 having coils 34. The arrangement just described is a diagrammatic showing of one form of vibration sensitive system which, for brevity, we will refer to as a seismophone. As the vibrations are received, the frame 30 will move in phase with the vibrations. The electromagnet 32, because of its mass, will tend to remain stationary in place, varying the magnetic flux flowing through core 33 and thus inducing an electromotive force in coils 34 in phase with the vibrations. The conductor 35 impresses the generated voltages upon the grid 36 of thermionic tube 37. Plate current flows from plate battery 38 through conductor 39, through primary 40 of transformer 41 to the plate 42 of the tube 37, to the filament 43, through conductor 44 to the negative terminal 45 of the plate battery 38. Filament battery 46 is provided to heat the filament 43. Variations of voltage on the grid 36 will cause vibrations in the plate current in sympathy therewith. The variations in the plate current are picked up by the secondary coil 47 of transformer 41 and impressed upon the grid 48 of tube 49. Plate current will flow from plate battery 50 through conductor 51 through coil 52 of the transformer 53, through conductor 54 to the plate 55, to filament 56, through conductor 58, to the negative terminal 59 of the plate battery 50. A filament battery 60 is provided for heating the filament 56. A coil 61 in inductive position with coil 52 furnishes voltage through conductor 62, to the plate 63 and the grid 64 of the thermionic tube 65, which is provided with a filament 66 heated by a filament battery 67. The thermionic tube 65 is a rectifying tube which rectifies the voltage and delivers a pulsating direct current to a filter. The filter section consists of a capacity 70 and a resistance 71, and serves to smooth the direct current proportional to the average voltage delivered by the transformer coil 61 to the rectifying tube 65. As a result of this, a direct current voltage is impressed by conductor 72, conductor 73, conductor 35, upon the grid 36 of vacuum tube 37.

It is well known in the art that the sensitivity of thermionic tubes, or amount of amplification, may be controlled by the adjustment of the direct current voltage upon the grid. The voltage supplied to grid 36 from the rectifying tube 65 and filter will control the amplification of vacuum tube 37. By proper variations of transformer winding 61, vacuum tube rectifier 65, resistance 71, and capacity 70 of the filter, the amplification of tube 37 can be controlled to any predetermined limitations, and the energy delivered to the recording unit will be held to a constant amount regardless of the interrupted voltage delivered by the seismophone.

A coil 74, inductively coupled to coil 52, delivers voltage to coil 75, wound around core 76. Pivoted adjacent core 76 is an armature 77 provided with a spring 78. The armature 77 carries a mirror 79 upon which is focused by lens 80 a beam of light from incandescent light 81. A battery 82 supplies current for the light 81. The reflected beam from mirror 79 passes along the path 83 to a photographic film 84 which is moved rapidly by motor 85. As the plate current of tube 49 varies, the coil 74 of the transformer 53 will deliver varying voltages to coil 75, thus causing a varying current therein. This, in turn, will induce a magnetic field in phase with the vibrations being received in core 76, attracting the armature 77 more or less strongly, making a record upon the photographic film 84.

When the seismophones are placed at a considerable distance from the shot, that is, when the distance from 8 to 11 in Figure 1 is great, the amplitude of the waves along the path 8—16—11 in Figure 1 is only slightly larger than that of the early reflected waves which follow paths 8—18—11 and 8—20—11. In this case, the apparatus shown at Figure 2 will work well and receive a record such as shown in Figure 3. The objects of the invention of application Serial No. 721,541 will be fulfilled, namely, the true beginning of the direct wave will be at full amplitude on the record and the following waves will be controlled or governed to a uniform amplitude.

Referring now to Figure 4, trace 1 is a graph of the amplitude received at seismophone 11, plotted at the instant of origin of the seismic waves at 8. For a short time following the detonation, no amplitude of motion would exist at the seismophone station. When the direct wave along path 8—16—11 reaches the seismophone station 11, the amplitude will reach the maximum, as shown by point E. The amplitude of reflected wave 8—18—11 is represented by point A. The amplitude of reflected event 8—20—11 is represented by point B. C and D represent the amplitudes of events deeper than A and B, not shown on Figure 1. As a result of these amplitudes of motion, there will be developed a floating governing charge on filter condenser 70 of Figure 2 and the sensitivity of the amplifier is shown by the curve, trace 2. This curve is plotted in percent of maximum sensitivity. Before the direct wave arrives along path 8—11—16 of Figure 1, the amplifier will be receiving no electrical voltage from the seismophone, because no motion has taken place and the amplifier is fully sensitive. The first impact E of the direct wave arriving along path 8—16—11 of Figure 1 will come at maximum sensitivity and the rectifying tube 65 of Figure 2 will receive a voltage from the output winding 61 and shortly thereafter a floating charge, for governing purposes, will be acquired by condenser 70. This governing charge will reduce the sensitivity of tube 37 as shown by trace 2 of Figure 4. After the amplitudes of motion have grown smaller, the governing charge becomes smaller because the output voltage at 61 is less. Under these conditions, the amplifier resumes greater sensitivity and approaches full sensitivity as the amplitudes of motion die out. Knowing the amplitude of motion and the sensitivity (traces 1 and 2 of Figure 4), we may compute the resulting amplitude which will be recorded by the recording mechanism upon sensitized strip 84. The curve of resulting amplitude is represented by trace 3 of Figure 4. Trace 3 of Figure 4 is the type of trace which has been received time and again with the actual apparatus in the field.

When, however, the distance from the shot point 8 to seismophone 11 is decreased, the direct wave along path 8—16—11 arrives at much greater amplitude than the following reflected waves arriving along paths 8—18—11 and 8—20—11. The high amplitude direct wave causes a large voltage input to the amplifier from the seismophone with a resulting high voltage charge on condenser 70 of Figure 2. The high voltage charge completely blocks tube 37 and makes it very insensitive with the result that the amplifier will not resume useful governed sensitivity until the high voltage floating charge has leaked off through resistance 71 of Figure 2. I have found, in practice that, when the seismophone is placed close to the shot point and the apparatus shown in Figure 2 is employed, that a record having a dead space with no recorded amplitudes for the early geological strata is obtained. The device will record control values of arrivals from intermediate and deeper strata.

Referring now to Figure 5 which is a graph showing the conditions obtained when seismophones are placed close to the shot point, using the apparatus shown in Figure 2, trace 1 is the average amplitude received at seismophone 11, plotted in percent of maximum. Zero time is the instant of detonation of the explosive charge at point 8. As in Figure 4, no amplitude of motion will exist at seismophone 11 until the direct wave arrives along path 8—16—11. The maximum amplitude is represented by point E. The amplitude of reflected event 8—18—11 is represented by point A. The amplitude of reflected event 8—20—11 is represented by point B. C and D are reflections of events from deeper strata than A and B not shown on Figure 1.

It will be observed that the direct wave arrival is much greater in amplitude than that of the following events. Trace 2 represents the sensitivity of the amplifier and point X shows that the sensitivity is reduced so much that, during this time interval, a portion of the recorded arrivals are not amplified enough to be useful. The time constant of the filter circuit in the amplitude limiter is held sufficiently low, however, so that the high voltage floating charge leaks off rapidly and the amplifier resumes a useful governed sensitivity sufficiently soon to produce intermediate and late reflected events. The time constant of the resistance-capacity network may be decreased by lowering either the value of resistance 71 or the capacity 70 or both, of the circuit shown in Figure 2.

Trace 3 of Figure 5 represents the resulting amplitude reproduced by the recorder on sensitive strip 84. It will be observed that a useless or dead space is shown corresponding to the portion X in which the sensitivity of the amplifier was reduced by the high blocking voltage upon condenser 70. This explains the dead space received upon the record. This dead space upon the record is undesirable because the reflected waves from shallow geological strata which would occur at this place on the record are lost. This is the first disadvantage of the form of apparatus shown in Figure 2.

In order to have the amplifier return rapidly to a useful governed sensitivity, the time constant, as has been heretofore pointed out, must be sufficiently low for the high voltage initial charge to leak off rapidly. During this portion of the curve, the sensitivity is changing so rapidly that amplitude distortion of the wave train of reflected energy may occur, that is, even though the first cycle of wave motion were equal in amplitude to the trailer cycles, the trailer cycles will be reproduced with greater resulting recording amplitude as a result of rapidly increasing sensitivity. This constitutes a disadvantage of the form of apparatus shown in Figure 2.

Even when the small amplitudes exist at the seismophone, such as those produced by the late reflected waves, a small governing charge exists on the condenser 70 of Figure 2, which prevents the amplifier from reproducing these motions at one hundred percent sensitivity of the amplifier. This can be readily seen by reference to Figure 4, in which it will be observed that trace 2 does not reach one hundred percent sensitivity until all the motions become extremely low in amplitude. This may be further seen by trace 2 of Figure 5. In both instances, the sensitivity approaches maximum when the motions at the seismophone are low in amplitude but does not actually reach one hundred percent sensitivity until all motions have ceased.

One object of my invention is to provide a method and apparatus for making geophysical explorations in which the true beginning of the direct wave is recorded at maximum sensitivity, while controlling or limiting all intermediate amplitudes to a convenient value, for analysis. By permitting the first arrivals to be recorded at maximum sensitivity, an accurate appraisement of the length of time of the direct wave to arrive supplies a means for computing the thickness of the weathered layer.

Another object of my invention is to provide a means and method of controlling the amplitude of arrivals, while permitting the recording of reflected waves from shallow geological strata.

Another object of my invention is to provide a means and method of limiting the amplitude of electrical manifestations and of geophysical vibrations admitting of the use of a larger time constant filter network to prevent amplitude distortion.

Another object of my invention is to provide a means of geophysical exploration in which reflected events from shallow and intermediate strata are recorded at a governed amplitude while permitting the record of late reflected events from deep lying geological strata to be recorded at maximum sensitivity of the amplification channel.

Another object of my invention is to provide a device for recording geophysical vibrations at governed amplitudes, which will be operative regardless of the location of the seismophone with respect to the point of origin.

Other and further objects of my invention will appear from the following description.

In order to eliminate the dead spot on the record, which occurs when the seismophones are placed close to the shot point and in order to receive elastic waves from shallow strata, I make use of a circuit network which I term the "upper threshold". In order to receive the late reflected events from deep lying strata at the full sensitivity of the amplifier, I make use of a circuit network which I term the "lower threshold".

During the time interval after the direct waves have arrived and before the late reflected events from the deep lying strata occur, the amplifier sensitivity is governed between values set and determined by manual adjustment of the upper and lower thresholds. I would like to point out, at this time, that during the time interval occurring after the early arrivals and before the late arrivals, the amplifier is automatically governed in sensitivity in the apparatus shown in Figure 2, by the floating charge of condenser 70. The dual threshold adjustments determine the limits for the amplifier sensitivity.

Having two limits within which the sensitivity of the amplifier is governed, the arrangement permits of a more suitable selection of the time constant of the filter circuit network so that amplitude distortion will be eliminated as will hereinafter be more fully pointed out.

Let us consider first, the case in which seismophone 11 is close to the shot point 8. When an explosive is detonated at the shot point 8, the direct wave arriving along path 8—16—11 is much greater in amplitude than the waves arriving along path 8—18—11 or by path 8—20—11. The amplitude relationship is shown by trace 1 of Figure 7 in which the direct wave appears at point E, the arrival along path 8—18—11 by point A, and the arrival along path 8—20—11 by point B. Points C and D represent later arrivals from deeper lying strata not shown in Figure 1.

The seismophone of Figure 6 receives the voltage occasioned by the first direct wave arrival represented by point E of Figure 7, and delivers to the input of the amplifier a voltage variation in phase with the motions of the earth at the seismophone position. The first vacuum tube 37 of Figure 6 receives this voltage variation and delivers it through tube 49 to the primary winding 52 of the transformer. The secondary winding 61 of transformer 53 delivers a voltage variation to the rectifier tube which places a floating charge on filter condenser 101.

Let us make reference at this time to the lower threshold network of Figure 6. The action of winding 61 is to place alternately a positive and then a negative voltage on a lead wire 62, in phase with the motions of the earth as they move upwardly and downwardly at the seismophone position. When the grid plate combination 103 receives positive potential, the rectifier tube 104 passes current to the filter network 105 and a floating charge is built up on condenser 101. When the voltage becomes negative the tube does not pass current. It will be observed that, if the adjustable arm 109 were moved downwardly so that resistance 102 were bypassed, the arrangement would be that shown in Figure 2 and the lower threshold would not function to place a bias on lead wire 62, and the function of the lower threshold would be eliminated.

The battery 107 in the lower threshold has a negative terminal toward the grid plate combination 103 of tube 104. As the arm 109 is moved upwardly over resistance 102 a negative threshold bias is placed upon the grid plate combination 103 of the rectifier tube 104, the amount of the bias depending upon the setting of arm 109.

When the winding 61 of the transformer 53 places a positive voltage on lead wire 62 equal to the threshold bias of the lower threshold, the threshold bias being opposite in polarity will nullify the positive voltage developed by the winding and no positive potential will be delivered to the rectifier tube 104. When the winding 61 has induced therein a greater positive voltage than the opposing threshold value, the rectifier tube 104 receives a positive resulting potential and delivers a governing floating charge to the filter network 105. It will be appreciated that, by proper adjustment of the arm 109, all of the small amplitude arrivals from deep geological strata may be reproduced with full sensitivity of the amplifier, while the arrangement will retain the desirable feature of limiting the amplitude of arrivals from intermediate strata. This follows because the threshold bias may be sets to nullify the positive potential delivered by winding 61 for the small amplitude arrivals from deeper strata. It will be observed that the use of a lower threshold accomplishes one object of my invention, namely, enabling the limitation of amplitude of arrivals from intermediate strata, while permitting the reception of arrivals from deeper lying strata, which arrivals are normally of smaller amplitude at the full sensitivity of the amplification channel.

Still referring to Figure 6, the upper threshold comprises a vacuum tube 111 in conjunction with battery 112 and adjustable arm 113 acting upon resistance 114. The upper threshold network is connected by conductors 115 and 116 so as to bypass all voltage above a certain amount, as determined by the setting of arm 113.

If battery 112 were one of high voltage and the arm 113 moved upwardly, the voltage delivered by winding 61 to conductor 62 would not be sufficiently high to be bypassed by the upper threshold network because the opposing potential of battery 112 would prevent this.

When battery 112 is of voltage within the range developed by winding 61 and the adjustable arm 113 is moved downwardly off resistance 114, there will be no opposing potential placed in the upper threshold network and all positive voltage which is developed on conductor 119—115 will be bypassed by the tube 111. This follows because the grid plate combination 120 of the rectifier tube 111 will pass current as soon as positive potential occurs upon the grid plate combination. It will be observed that, when the adjustable arm 113 is set downwardly at a position off of resistance 114, no current is passed by the rectifier tube 104 to the filter network 105, because the impedance of the rectifier filter network 105 is high in comparison to the upper threshold network. The upper threshold, therefore, acts as a by-pass for all voltages above the value determined by arm 113. In the position referred to, namely, when arm 113 is moved downwardly off resistance 114, the amplifier will fail to govern or limit amplitudes because no floating, governing, or limiting charge will be acquired by the condenser 101.

If we have determined the amount of the positive peak voltage delivered to conductor 62 by the winding 61 for the arrival A of Figure 7, we may now set the arm 113 at some intermediate point such as shown in Figure 6 so that the positive threshold bias in the upper threshold network is equal to this positive peak voltage. With this adjustment, let us consider the action of the amplifier when the seismophone is placed near the shot point and receives a large amplitude direct wave for the first arrival. This is the situation shown in Figure 7. The upper threshold bias has been adjusted to a value equal to that of the positive peak voltage delivered to conductor 62 as shown by amplitude A on trace 1. Now, when a greater amplitude of motion occurs than represented by the value of point A on trace 1 of Figure 7, a greater voltage will be delivered by the winding 61 and the upper threshold will bypass the excess voltage above that to which the threshold has been set. In other words, the entire action would be as follows: The direct wave 8—16—11, represented by point E of Figure 7, would engage the seismophone and the first peak of motion would occur at full output on the output transformer. This would deliver a large voltage on winding 61 and the excess voltage over the threshold would be bypassed by tube 111. The upper threshold network, it will be observed, will prevent the total charge acquired by the condenser 101 of the filter network 105, from being greater in amount than the value of the voltage determined by arm 113. If the arm is properly set at the value of the amplitude of point A in Figure 7, the governing charge is just sufficient to govern the first useful geological strata arrival A and all excess positive voltage caused by the first arrival E will be bypassed by the upper threshold. This network of the upper threshold prevents the dead spot such as shown in Figure 5, thus permitting the early arrival A to be reproduced at a governed or limited amplitude suitable for analysis, while in no way preventing the reproduction of intermediate amplitudes at governed or limited amplitudes.

Trace 2 of Figure 7 represents the resulting sensitivity of an amplifier with the upper threshold in use, the sensitivity occurring from an amplitude represented by trace 1.

Trace 3 of Figure 7 shows the amplitude on the record. I have conducted actual operations in the field and have been able to limit all motions immediately following the direct wave or first arrival to suitable values with seismophones located as close as 75 feet from the shot point. It will be observed from trace 2 of Figure 7 that, when the amplitude of motion becomes smaller, the amplifier reaches one hundred percent sensitivity due to the useful action of the lower threshold network.

It will also be observed that it will not be necessary to use a low time constant in the filter circuit network because the sensitivity need not increase as rapidly as it would in the case of Figure 5.

The arrangement I have described is simple and practical in actual use and does not require difficult adjustment and constant attention. The desired amplitude of the required waves can be readily ascertained from the physical dimensions of the photographic record and the particular amplitude which is deemed convenient for analysis on the particular size of record. The lower threshold value is set by arm 109 so that the desired amplitude is obtained upon the photographic record. This value, once set normally, does not require readjustment for the particular apparatus involved. When a new area is explored, the time constant of the filter network 105, that is the limiting governing filter, is adjusted by setting arm 122 upon resistance 110. This time constant is adjusted so that the rate at which the floating charge on condenser 101 leaks off, is approximately such that the proper increase in sensitivity will take place to compensate for the decay in amplitude as the waves arrive from the deeper lying geological strata. This adjustment is not critical and need not be changed under normal circumstances until new and different geological sections are explored.

The third adjustment is that of the upper threshold and is made by moving arm 113 over resistance 114. This adjustment is made at a point where the upper threshold will bypass the first arrivals or direct waves which are appreciably higher in amplitude than the early useful reflected waves when the seismophone is near the shot point. When this adjustment is made, the seismophone may be removed from the shot point and the entire network will govern quite satisfactorily.

After the three adjustments just referred to, namely, those of arm 109, arm 122, and arm 113, have been made, which adjustments can be accomplished very easily with one or two experimental shots in a new area, the entire area may be explored with the assurance that a high percentage of all records taken will show all arrivals from useful geological strata including the early and late arrivals of usable amplitudes.

The arrangement shown in Figure 6 is merely one arrangement of my invention and is a simple circuit which I have shown by way of illustration for use in explaining my invention. It will be understood by those skilled in the art that there are many variations which may be used such as the employment of the multiple element vacuum tube for accomplishing both the functions of rectifier tube 104 and rectifier tube 111.

In actual practice, I prefer to use an arrangement such as shown in Figure 8. This arrangement is more flexible in design. I employ indirectly heated vacuum tubes and full wave rectification to supply voltage to the filter condenser for the floating charge.

In Figure 8, I show a modification of an upper threshold arrangement in which the cathode 202 of tube 208 is indirectly heated by heater coil 201. As understood by those skilled in the art, when the cathode 202 becomes heated, it will emit electrons and current will pass from plate 203 to the cathode 202, independent of the heating coil 201. As in an ordinary vacuum tube, when the grid 206 receives positive potential, a greater current will flow from the plate 203 to the cathode 202 and when the grid 206 receives a negative potential, less plate current will flow.

In the ordinary vacuum tube, the maximum amplification is obtained from the tube by placing a negative potential of optimum value upon the grid return circuit. In the arrangement shown in Figure 8, the cathode to grid bias is positive an amount determined by arm 205 and battery 204. The relationship between amplification and the amount of bias for one of the indirectly heated cathode tubes used in the arrangement shown in Figure 8 is shown in Figure 9, in which the bias is plotted against percent maximum amplification. From Figure 9 it can be readily seen that the tube used reaches its maximum sensitivity when the arm 205 is adjusted so as to have a bias of about three volts.

If, now, the bias upon conductor 207 of Figure 8, were increased, this will perform substantially the same result as increasing the cathode bias one volt positively. Under these circumstances, with one volt negative bias on conductor 207, the tube 208 will be operating at reduced sensitivity, namely at the point of a Figure 9. If the bias on conductor 207 of Figure 8 were increased positively one volt, the net result would be equivalent to lowering the cathode's positive bias one volt and, under these circumstances, the tube 208 will be operating at a reduced sensitivity as at point b of the curve shown in Figure 9.

From these considerations, it is apparent that either a positive or negative floating charge upon filter condensers 209 and 210 will govern the sensitivity but only if the arm 205 is such that the amplification will be a maximum if there is no governing charge of the filter condensers 209 and 210.

In some of the arrangements I have used, I have employed a circuit network delivering a negative potential to the governing filter condensers, but for simplicity of network, I prefer to supply a positive floating charge such as is supplied in the arrangement shown in Figure 8.

Full wave rectification is provided by the center tapped winding 211. One conductor 212 from one side of the winding 211 goes to one anode 214 of the full wave rectifier tube. The second conductor 213 from the opposite side of winding 211 leads to the second anode 215 of the full wave rectifier tube 216. The tube 216 may be any one of a number of commercial vacuum tubes.

It is a characteristic of an anode to pass current to the cathode 217, which it will be observed is an indirectly heated cathode, when positive potential occurs on the anode. The tube will not pass current when a negative potential is impressed on the anode. As a result of the center tapped winding 211 and the connections 212 and 213, when the potential of conductor 212 becomes positive, anode 214 will pass current to the cathode 217 and filter network. When conductor 213 becomes positive, anode 215 will pass current to the cathode and filter network. This full rectification provides a floating charge on the filter condensers 209 and 210 freer of rapid variations and makes it easier to render the floating charge free of minor variations of frequency which may be impressed on the anodes.

I prefer to use at least a two section filter arrangement which is comprised respectively by condenser 209 and resistance 218, and condenser 210 and resistance 219. This arrangement permits a better elimination of minor variations in the floating charge in the vicinity of the frequency being impressed on the diodes. It is important to use an effective filter arrangement since in actual use additional stages of amplification are interposed between the first tube 208 and the last tube 220 of the amplifier. This prevents distortion when a very large governing charge is acquired by the filter system. This distortion may be explained as follows: when one governing charge is on the filter system, the first tube is fully sensitive and only a small voltage variation is required on the first grid network to produce usable amplitudes on recorder strip 84. When a large governing charge is placed on the filter network, the first tube becomes quite insensitive and, in order that the record receive usable amplitudes, the voltage (as for example that generated by the arrival of reflections from shallow geological horizons) will be great and the tube will distort because the voltage variation on the grid will pass the limits where the plate current variation will be linear with respect to grid variations. This latter effect is well known to those skilled in the art. It is, therefore, to be understood that I do not wish to be limited to any given number of stages of amplification or by any fixed arrangement of constants.

In the arrangement shown in Figure 8, a different embodiment of upper threshold network is shown, employing a tube with two anodes. In this arrangement, when a very large voltage occurs at the rectifier (as for example that occasioned by the first arrival or direct wave) the rectifier will pass current and deliver this to the filter network. The tube 221, by means of its two anodes 222 and 223, will bypass all potential above that determined by the threshold and particularly by the adjustment of arm 224 to the potential of battery 225. It will be observed that the arm 224 and the battery 225 in conjunction with tube 221 furnish the means of providing a setting of a limit above which it is impossible for the governing floating charge to go. It may be well to point out at this time that a positive floating charge is used.

Similarly, the adjustment of arm 230 upon resistance 231 in connection with battery 232 provides a means for adjusting the lower threshold.

From the foregoing, it will be seen that I have accomplished the objects of my invention. Without the amplitude limiting arrangement practically all of the amplitudes received except those from very deep lying strata are too large for analysis. Amplitudes decay and die out very rapidly at the end of the record and only a very short interval exists where proper analysis can be made. With the use of an amplitude limiting system such as shown in Figure 2, certain disadvantages heretofore pointed out are inherent which are eliminated by the arrangements shown in Figures 6 and 8. All references, including those from very shallow layers to those of the deepest layers are received at amplitudes convenient for analysis in a single determination. This eliminates the necessity of setting the amplifier channel to such sensitivity that separate shots must be made with separate settings of amplifier sensitivity in order to receive indications from strata at different depths. A complete observation and usable record can be made from a single shot by the use of the method of my invention.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a method of making geophysical explorations in which earth vibrations are generated, the vibrations and reflections thereof from geological strata are converted into electromotive forces of varying voltages in sympathy with said vibrations and reflections, and said voltages are amplified and recorded, the steps of amplifying voltages below a predetermined value a predetermined amount, amplifying voltages between said predetermined value and a second predetermined value inversely as a function of the voltage, and amplifying voltages higher than said second predetermined value an amount equal to the amplification voltages of said second predetermined value.

2. Apparatus for making geophysical explorations including in combination a seismophone adapted to convert earth vibrations into electromotive forces of varying voltages in sympathy with said vibrations, an amplification channel, a recorder, means for impressing the output of said seismophone upon said amplification channel, and means responsive to the output of said amplification channel between predetermined voltages for varying the sensitivity of said amplification channel inversely as a function of the voltage of said output.

3. Apparatus as in claim 2 including means for amplifying voltages below the lower of said predetermined voltages at the maximum sensitivity of said amplification channel.

4. Apparatus as in claim 2, including means for amplifying voltages above the upper of said predetermined voltages at the sensitivity at which the amplification channel amplifies said upper voltage.

5. In a method of making geophysical explorations in which earth vibrations are generated, the vibrations converted into electromotive forces of varying voltages in sympathy with said vibrations, the steps of amplifying the voltages and varying the degree of amplification of voltages between predetermined values inversely as a function of the voltage.

6. An apparatus for making geophysical explorations including in combination a seismophone, an amplifier having a thermionic tube, a recorder, means for impressing the output of said seismophone upon said amplifier, means for delivering a portion of the output of said amplifier to said recorder, a thermionic valve, a condenser, means for impressing a portion of the output of said amplifier upon said thermionic valve, means for delivering the output of said thermionic valve to said condenser, means for biasing said thermionic valve to prevent it from passing current below a predetermined voltage, and means for impressing the charge of said condenser upon the grid of the thermionic tube of said amplifier.

7. In an apparatus for making geophysical explorations having in combination a seismophone, an amplifier having a thermionic tube, a recorder, means for impressing the output of said seismophone upon said amplifier, and means for delivering a portion of the output of said amplifier to said recorder; a first thermionic valve, a condenser, means for impressing a portion of the output of said amplifier upon said first thermionic valve, means for delivering the output of said first thermionic valve to said condenser, means for impressing the charge of said condenser upon the grid of said thermionic tube of said amplifier, a second thermionic valve bypassing said condenser, and means for biasing said second thermionic valve to permit said condenser to discharge voltages above a predetermined amount.

8. An apparatus for making geophysical explorations including in combination a seismophone, an amplifier having a thermionic tube, means for impressing the output of said seismophone upon said amplifier, a first thermionic valve, a condenser, means for impressing a portion of the output of said amplifier upon said first thermionic valve, means for delivering the output of said first thermionic valve to said condenser, means for biasing said first thermionic valve to prevent it from passing current below a predetermined voltage, means for impressing the charge of said condenser upon the grid of the thermionic tube of said amplifier, a second thermionic valve bypassing said condenser, and means for biasing said second thermionic valve to prevent it from passing current below a predetermined voltage.

HAROLD R. PRESCOTT.